(12) United States Patent
Ahn

(10) Patent No.: US 8,568,045 B2
(45) Date of Patent: Oct. 29, 2013

(54) LANGUAGE INPUT SYSTEM

(76) Inventor: Matthew Y. Ahn, Buena Park, CA (US)

(*) Notice: Subject to any disclaimer, the term of this patent is extended or adjusted under 35 U.S.C. 154(b) by 371 days.

(21) Appl. No.: 12/893,277

(22) Filed: Sep. 29, 2010

(65) Prior Publication Data

US 2011/0170927 A1 Jul. 14, 2011

(30) Foreign Application Priority Data

Jan. 14, 2010 (KR) .................. 10-2010-0003454

(51) Int. Cl.
*B41J 5/10* (2006.01)

(52) U.S. Cl.
USPC .............. 400/484; 400/110; 341/28; 345/171

(58) Field of Classification Search
USPC ........................................ 400/484
See application file for complete search history.

(56) References Cited

U.S. PATENT DOCUMENTS

| 2,625,251 | A | * | 1/1953 | Kong | 400/484 |
| 4,187,031 | A | * | 2/1980 | Yeh | 400/484 |
| 5,213,422 | A | * | 5/1993 | Garfinkle | 400/484 |
| 5,945,928 | A | * | 8/1999 | Kushler et al. | 341/28 |
| 6,462,678 | B1 | * | 10/2002 | Ahn | 400/110 |
| 7,061,403 | B2 | * | 6/2006 | Fux | 400/110 |
| 2008/0042885 | A1 | * | 2/2008 | Kunigita et al. | 341/28 |
| 2008/0068228 | A1 | * | 3/2008 | Jeong | 341/28 |
| 2008/0158023 | A1 | * | 7/2008 | Chung | 341/28 |
| 2008/0174560 | A1 | * | 7/2008 | Park | 345/171 |
| 2009/0066656 | A1 | * | 3/2009 | Jung et al. | 345/171 |

FOREIGN PATENT DOCUMENTS

| JP | 09016301 A | * | 1/1997 |
| KR | 2001039239 A | * | 5/2001 |
| WO | WO 2007073070 A | * | 6/2007 |

* cited by examiner

*Primary Examiner* — Jill Culler
(74) *Attorney, Agent, or Firm* — John K. Park; Park Law Firm

(57) ABSTRACT

This invention relates to any language input system using a keypad or a keyboard comprising a first group of seven keys for inputting a consonant by pressing a single key or simultaneously pressing a combination of keys thereof, and a second group of seven keys for inputting a vowel by pressing a single key or simultaneously pressing a combination of keys thereof, wherein the first group of seven keys are "ㅁ", "ㅇ", "ㅅ", "ㅣ", "ㄱ", "•" and "—", and the second group of seven keys are "ㅓ", "ㅏ", "ㅏ", "ㅣ", "ㅗ", "—", and "•". The advantages of the present invention are improving typing speed and efficiency by using only 14 key faces and relieving finger fatigue during manual data input operation.

8 Claims, 4 Drawing Sheets

| Initial Consonant Letters (Choseong) | ㄱ, ㄲ, ㄴ, ㄷ, ㄸ, ㄹ, ㅁ, ㅂ, ㅃ, ㅅ, ㅆ, ㅇ, ㅈ, ㅉ, ㅊ, ㅋ, ㅌ, ㅍ, ㅎ |
|---|---|
| Medial Vowel Letters (Jungseong) | ㅏ, ㅐ, ㅑ, ㅒ, ㅓ, ㅔ, ㅕ, ㅖ, ㅗ, ㅘ, ㅙ, ㅚ, ㅛ, ㅜ, ㅝ, ㅞ, ㅟ, ㅠ, ㅡ, ㅢ, ㅣ |
| Trailing Consonant Letters (Jongseong) | ㄱ, ㄲ, ㄳ, ㄴ, ㄵ, ㄶ, ㄷ, ㄹ, ㄺ, ㄻ, ㄼ, ㄽ, ㄾ, ㄿ, ㅀ, ㅁ, ㅂ, ㅄ, ㅅ, ㅆ, ㅇ, ㅈ, ㅊ, ㅋ, ㅌ, ㅍ, ㅎ |
FIG. 3
FIG. 4(a) 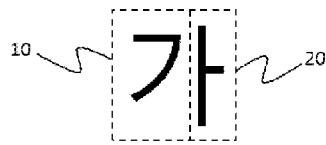  FIG. 4(b)
FIG. 4(c) 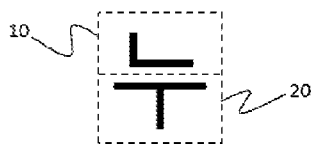 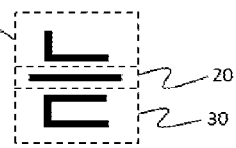 FIG. 4(d)
FIG. 4(e) 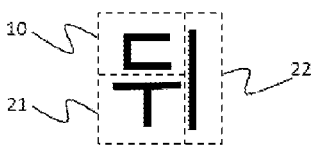  FIG. 4(f)

LANGUAGE INPUT SYSTEM

BACKGROUND OF THE INVENTION

The present invention relates to any language input system to input Hangul or other language characters using a keypad or a keyboard for improving typing speed and efficiency and relieving finger fatigue during manual data input operation. More particularly, this invention relates to any language input system using a keypad or a keyboard comprising a first group of seven keys for inputting a consonant by pressing a single key or simultaneously pressing a combination of keys thereof, and a second group of seven keys for inputting a vowel by pressing a single key or simultaneously pressing a combination of keys thereof.

Hangul is a phonemic alphabet for the Korean language organized into syllabic blocks. Each block, making up a syllable, consists of an initial consonant letter (Choseong) and a medial vowel letter (Jungseong) with or without a trailing consonant letter (Jongseong).

There are 24 simple consonant and vowel letters, equivalent to letters of the Latin alphabet, of which 14 are simple consonant letters and the rest 10 are simple vowel letters as in FIG. 2. 27 additional letters were made by clustering two or sometimes three of the simple consonant or vowel letters, of which 16 are consonant clusters and the rest 11 are diphthongs. Among the 16 consonant clusters, five double consonant letters were made by glottalizing five simple consonant letters. Thus, total of 51 letters, called Jamo, are the units, making up the Hanglul alphabet, for the initial consonant letters, medial vowel letters and trailing consonant letters. Among the 30 consonant letters, only 19 and 27 are used respectively as an initial consonant letter and a trailing consonant letter. In addition, all 21 vowel letters are used as a medial vowel. Therefore, the total number of possible Hangul syllables is 11,172 (=19×27×21).

FIGS. 4(a)~(f) describe how to form a syllable by combining an initial consonant letter and a medial vowel letter with or without a trailing consonant letter.

In typing or inputting a Hangul syllable or Hangul letters, Hangul automaton algorithms have been developed to process a series of keyboard or keypad strokes into letters comprising syllables, words and a sentence.

Traditionally, all Hangul input systems have been developed based on the assumption that an initial consonant letter, a medial vowel letter and a trailing consonant letter, if any, must be sequentially typed to input one syllable, just like the Alphabet keyboard's sequential input system. However, some keystrokes can be typed together and this simultaneous typing will improve input speed. For instance, an initial consonant letter and a medial vowel letter do not have to be typed sequentially because even if they are typed together, they can be recognized as one initial consonant letter and another medial vowel letter because an input system can be programmed to recognize the simultaneous typing as one consonant letter and another medial vowel letter to form a syllable. Despite this insight to improve typing speed, all conventional Hangul input systems were developed to sequentially type a consonant letter for an initial consonant letter, a vowel letter for a medial vowel with or without second consonant letter for a trailing consonant letter and then, to move onto next syllable, repeating the same sequential typing.

Conventionally, there are two types of Hangul keyboard input system—a two set system and a three set system. In a two set system, consonant and vowel letters are arranged respectively on the left and right side of a keyboard and a user sequentially types a consonant letter and a vowel letter for inputting a syllable. In a three set system, letters for initial consonant letters, medial vowel letters and trailing consonant letters are respectively arranged on the left, middle and right side of a keyboard and a user sequentially types an initial consonant letter, a medial vowel letter and a trailing consonant letter, if any. In both kinds of input systems, some compound consonant or vowel letters are input by sequentially typing two consonant or vowel letters on the keyboard.

Another major type of Hangul input system has been developed as a reduced keyboard or keypad for electronic devices such as cellular phones or PDAs. Due to their small size, there has been demand for a Hangul system having small number of keys. A cellular phone generally has 12 keys—10 digits, # and *, and accordingly, a number of Hangul input systems have been developed to accommodate the limited number of keys on a cell phone. The keys on a cellular phone have minimal number of essential Jamo letters and all other Jamo are entered by pressing a combination of the essential Jamo letters. However, all Hangul input systems have adopted the method of "sequential" typing of a couple of keys and thus, entry of a single symbol requires many keystrokes and makes text input slow and tedious and the use of reduced keyboard very inconvenient.

For instance, Chun-Ji-In system was developed to input all vowel letters by using only three keys of "•", "—" and "ㅣ". Under the system, "ㅘ" is input by sequentially pressing "•", "—", "ㅣ" and "•". However, this system is very slow and tedious because for example, it requires as many as five sequential keystrokes to input a vowel of "ㅞ" or "ㅙ".

Accordingly, a need for any language input system to input Hangul or any other language characters from a keypad or a keyboard for improving typing speed and efficiency and relieving finger fatigue during manual data input operation has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide any language input system to input Hangul or any other language characters from a keypad or a keyboard for improving typing speed and efficiency and relieving finger fatigue during manual data input operation.

Another object of the invention is to provide any language input system using a keypad or a keyboard comprising a first group of keys comprising seven key faces for inputting a consonant by pressing a single key or a combination of keys thereof, and a second group of keys comprising seven key faces for inputting a vowel by pressing a single key or a combination of keys thereof.

Still another object of the invention is to provide Any language input system using a computer-implemented keypad or keyboard comprising a first group of keys for inputting a consonant by pressing a single key or simultaneously pressing a combination of keys thereof, and a second group of keys for inputting a vowel by pressing a single key or simultaneously pressing a combination of keys thereof, wherein the first group of keys consists essentially of seven keys and is arranged on a first matrix of three rows and three columns, and the second group of keys consists essentially of seven keys and is arranged on a second matrix of three rows and three columns.

An aspect of the invention provides any language input system wherein the first group of keys comprises seven current or archaic Korean letters of "ㅁ", "•", "Ｏ", "ㅅ", "—", "ㅣ", and "ㄴ" and the second group of keys comprises seven current or archaic Korean letters of "ㅓ", "•", "ㅜ", "ㅏ", "ㅣ", "ㅗ", and "—"; and each group of seven keys is arranged on a matrix of three rows and three columns.

The advantages of the present invention are: (1) any language input system to input Hangul or any other language characters from a keypad or a keyboard for improving typing speed and efficiency and relieving finger fatigue during manual data input operation; (2) any language input system has only 14 letters—7 for consonants and 7 for vowels so that the system can be accommodated in a small keypad without compromising typing speed; and (3) the key layout and simultaneous typing of multiple keys in any language input system can improve typing speed and convenience of its use.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 3 shows consonant and vowel letters used for an initial consonant letter, a medial vowel letter and a trailing consonant letter;

FIGS. 4(a)~(f) show the types of placement of an initial consonant letter, a medial vowel letter and a trailing consonant letter to make a syllable;

DETAILED DESCRIPTION EMBODIMENTS OF THE INVENTION

Figures 1, 2:
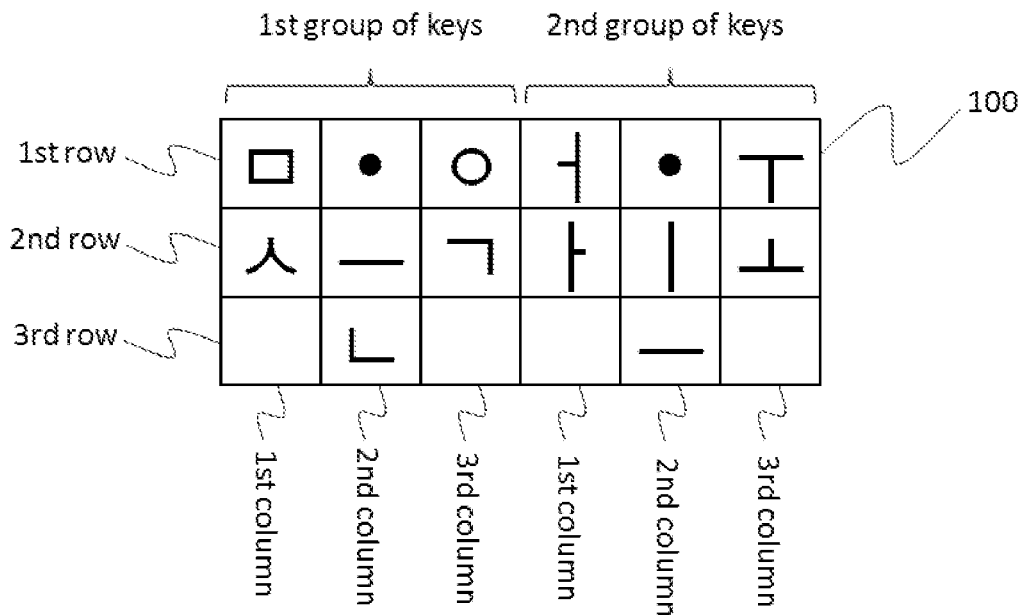
FIG. 1 is a diagram for any language input system showing first group of seven consonant keys and second group of seven vowel keys.
FIG. 2 shows the types of consonant and vowel letters of Hangul.

FIG. 2 shows the types of consonant and vowel letters in Hangul. There are 24 simple consonant and vowel letters, equivalent to letters of the Latin alphabet, of which 14 are simple consonant letters and the rest 10 are simple vowel letters. Additional 16 compound consonant letters were made by clustering two simple consonant letters and additional 11 compound vowel letters were made by clustering two or three simple vowel letters including an archaic simple vowel letter, "•". Even if "•" is currently not used, it still has very important function in creating many of the compound vowel letters. For instance, "ㅓ" conceptually consists of "—", "•", and "l".

In fact, all vowel letters can be dissected into a combination of "•", "—" and "l". For instance, "ㅔ" consists of "•", "—", and "l". As described above, Chun-Ji-In system uses these three elements to input all vowel letters, but its typing is very slow and tedious because it requires many keystrokes to input a vowel letter; for instance, "ㅖ" and "ㅒ" require five sequential keystrokes.

One Hangul syllable consists of an initial consonant letter and a medial vowel letter with or without a trailing consonant letter. Trailing consonant is called final consonant as well. As shown in FIG. 3, only 19 and 27 out of the 30 consonant letters are respectively used as an initial consonant letter and a trailing consonant letter.

FIGS. 4(a)~(f) show the types of placement of the three elements of an initial consonant letter 10, a medial vowel letter 20, and a trailing consonant letter 30. The syllables of FIGS. 4(a)~(f) transliterate to "ga", "gal", "nu", "neud", "dui" and "wid", respectively. While all 27 vowel letters are used as a medial vowel letter, not all consonant letters are used as an initial consonant letter or a trailing consonant letter.

FIG. 1 shows any language input system using a computer-implemented keypad or keyboard comprising a first group of keys for inputting a consonant by pressing a single key or simultaneously pressing a combination of keys thereof; and a second group of keys for inputting a vowel by pressing a single key or simultaneously pressing a combination of keys thereof; wherein the first group of keys consists essentially of seven keys and is arranged on a first matrix of three rows and three columns, and the second group of keys consists essentially of seven keys and is arranged on a second matrix of three rows and three columns. The first group of keys consists essentially of five Hangul simple consonant letters and two function keys: the five Hangul simple consonant letters of "ㅁ", "Ｏ", "ㅅ", "ㄱ", and "ㄴ", and the two function keys are "•" and "—". The second group of keys consists essentially of six Hangul simple vowel letters and one Hangul archaic vowel letter: "ㅓ", "ㅜ", "ㅏ", "ㅣ", "ㅗ", "—" and "•".

A Hangul syllable consists of an initial consonant letter, a medial vowel letter, and a trailing consonant letter, if any. A syllable can be entered by inputting an initial consonant letter, a medial vowel letter, and a trailing consonant letter, if any, by using the first group of keys for the initial consonant, the second group of keys for the medial vowel, and the first group of keys for the trailing consonant. One or a combination of keys on the first group of keys are simultaneously pressed for inputting an initial consonant letter or a trailing consonant letter, and one or a combination of keys on the second group of keys are simultaneously pressed for inputting a medial vowel letter.

An initial consonant letter and a medial vowel letter may be simultaneously pressed because sequential typing is not necessary between the initial consonant letter and the medial vowel letter. Unlike English alphabet or Latin characters, Hangul does not have to be input sequentially. Consonant and vowel letters of Hangul are separated on a keyboard or keypad and even if they are typed together, the input system or a computer can recognize them as separate and combine them to form a syllable. Only the trailing consonant needs to be typed separately. By simultaneously typing an initial consonant letter and a medial vowel letter, typing speed becomes a lot faster.

The consonant letters fall into five homorganic groups, each with a basic shape, and one or more letters derived from this shape by means of additional strokes. The five homorganic groups are as follows:

(1) Velar consonants (molar sounds): basic shape of "ㄱ", and "ㅋ" and "ㄲ";
(2) Coronal consonants (lingual sounds): basic shape of "ㄴ", and "ㄷ", "ㅌ", "ㄸ", and "ㄹ";
(3) Bilabial consonants (labial sounds): basic shape of "ㅁ", and "ㅂ", "ㅍ", and "ㅃ";
(4) Sibilant consonants (dental sounds): basic shape of "ㅅ", and "ㅈ", "ㅉ", "ㅊ", and "ㅆ"; and (5) Glottal consonants (throat sounds): basic shape of "ㅇ", and "ㅎ".

Therefore, the seven key faces for inputting a consonant are the five basic shapes of "ㄱ", "ㄴ", "ㅁ", "ㅅ", and "ㅇ", and two function keys of "•", and "—", wherein "•" and "—" are keys to input other consonants from the basic shapes of "ㄱ", "ㄴ", "ㅁ", "ㅅ", and "ㅇ".

Preferably, these seven key faces are placed on a 3×3 matrix wherein "•" and "—" occupy the central column because they are frequently used.

Thus, the following simultaneous keystrokes for consonants were made:

(1) Molar Sounds
ㄱ(g)="ㄱ", ㅋ(k)="ㄱ"+"—", ㄲ(gg)="ㄱ"+"ㅇ";

(2) Lingual Sounds
ㄴ(n)="ㄴ", ㄷ(d)="ㄴ"+"—", ㅌ(t)="ㄴ"+"—"+"•", ㄸ(dd)="ㄴ"+"—"+"ㅇ", ㅌㅇ(th)="ㄴ"+"—"+"•"+"ㅇ", ㄹ(l)="ㄱ"+"—"+"ㄴ", ㄹㅇ(r)="ㄱ"+"—"+"ㄴ"+"ㅇ";

(3) Labial Sounds
ㅁ(m)="ㅁ", ㅂ(b)="ㅁ"+"—", ㅍ(p)="ㅁ"+"—"+"•", ㅃ(bb)="ㅁ"+"—"+"ㅅ", ㅍㅇ(f)="ㅁ"+"—"+"•"+"ㅇ", ㅂㅇ(V)="ㅁ"+"—"+"ㅇ";

(4) Dental Sounds
ㅅ(s)="ㅅ", ㅈ(j)="ㅅ"+"—", ㅉ(jj, z)="ㅅ"+"ㄴ"+"—", ㅊ(c)="ㅅ"+"—"+"•", ㅅㅇ(sh)="ㅅ"+"ㅇ", ㅈㅇ(zh)="ㅅ"+"—"+"ㅇ", ㅊㅇ(ch)="ㅅ"+"—"+"•"+"ㅇ", ㅆ(ss)="ㅅ"+"ㅣ"; and (5) Throat Sounds
ㅇ(ng)="ㅇ", ㅎ(h)="ㅇ"+"—"+"•".

For vowel letters, the seven key faces consist of "ㅏ", "ㅓ", "ㅗ", "ㅜ", "—", "ㅣ", and "•". Under Chun-Ji-In system, "•", "—" and "ㅣ" keys must be sequentially pressed, but under the system of the present invention, simultaneous pressing is possible for all 21 vowel letters as follows because combinations of their keystrokes are all different:

ㅏ(a)="ㅏ", ㅐ(ae)="ㅏ"+"ㅣ", ㅑ(ya)="ㅏ"+"•", ㅒ(yae)="ㅏ"+"•"+"ㅣ", ㅓ(eo)="ㅓ", ㅔ(e)="ㅓ"+"ㅣ", ㅕ(yeo)="ㅓ"+"•", ㅖ(ye)="ㅓ"+"•"+"ㅣ", ㅗ(o)="ㅗ", ㅘ(wa)="ㅗ"+"ㅏ", ㅙ(wae)="ㅗ"+"ㅏ"+"ㅣ", ㅚ(oe)="ㅗ"+"ㅣ", ㅛ(yo)="ㅗ"+"•", ㅜ(u)="ㅜ", ㅝ(wo)="ㅜ"+"ㅓ", ㅞ(we)="ㅜ"+"ㅓ"+"ㅣ", ㅟ(wi)="ㅜ"+"ㅣ", ㅠ(yu)="ㅜ"+"•", ㅡ(eu)="—", ㅢ(ui)="—"+"ㅣ", ㅣ(i)="ㅣ"

The above 21 combinations are all different and thus, even if keys are simultaneously pressed, the input system can be programmed to recognize a vowel letter from a certain combination of simultaneous keystrokes.

Hangul is known for its capability to represent as many as 11,172 sounds and languages other than Korean consist of syllables as well. Thus, the input system of the present invention can be used for inputting other languages and the typing becomes a lot faster. For example, the English word "SCHOOL" is "SCHOOL" in English which transliterate to "스쿨" in Korean, "하교" in Korean which transliterate to "하교" in Korean, "學校" in Chinese which transliterates to "쉐쇼" in Korean, "學校" in Japanese which transliterates to "갓꼬" in Korean, "SCHULE" in German which transliterates to "슈레" in Korean, and "ESCUELA" in Spanish which transliterates to "에스쿠에라". "SCHOOL" in English requires five keystrokes, but using the input system of the present invention, three strokes are enough: the first for "스", the second for "쿠" and the third for "ㄹ". "SCHOOL" in Chinese and Japanese requires only two and three strokes, respectively. "SCHULE" in German and "ESCUELA" in Spanish require six and seven strokes, respectively, but using the input system, respectively two and four strokes are enough. The input system comprises algorithms to convert the input into meaningful word in each language. Preferably, the algorithms utilize dictionaries.

Figure 5:
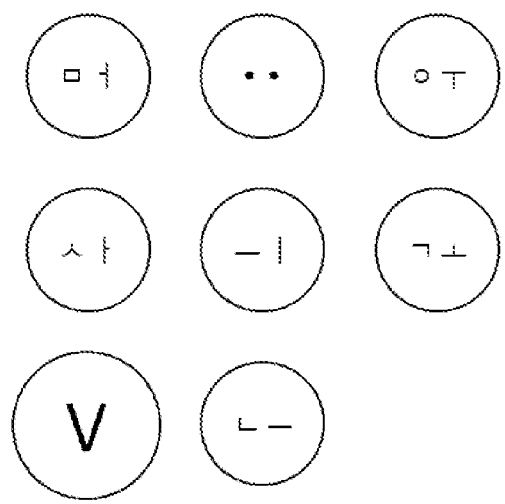
FIG. 5 is a diagram for another embodiment of any language input system having a toggle key.

FIG. 5 is a diagram for another embodiment of any language input system having a toggle key (V). The toggle key is to be pressed for using the second group of seven key faces. The input system comprises seven keys each of which has two key faces, one of which is from the first group of seven key faces and the other of which is from the second group of seven key faces. To input a vowel letter, the toggle key has to be pressed together.

Figure 6:
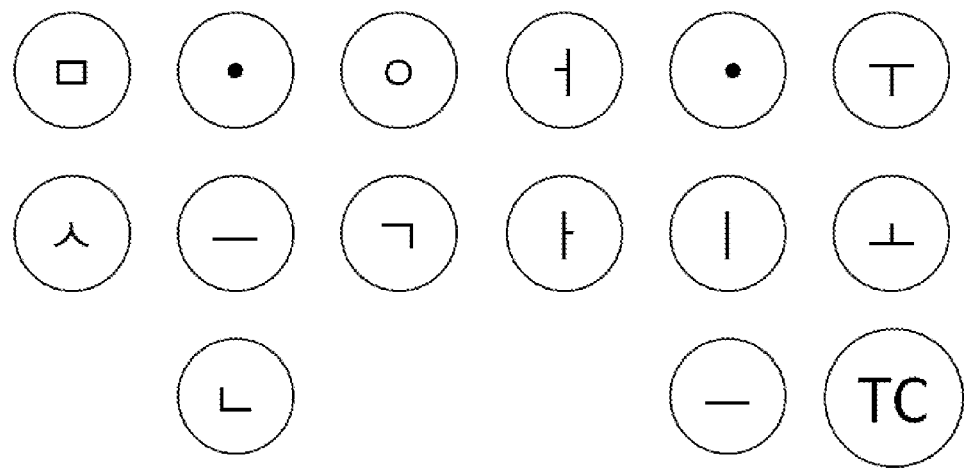
FIG. 6 is a diagram for yet another embodiment of any language input system having a trailing consonant key.

FIG. 6 is a diagram for yet another embodiment of any language input system having a trailing consonant key. The trailing consonant key is arranged on the second matrix of three rows and three columns for inputting a trailing consonant and pressed to input a trailing consonant using the first group of seven keys.

Figure 7:
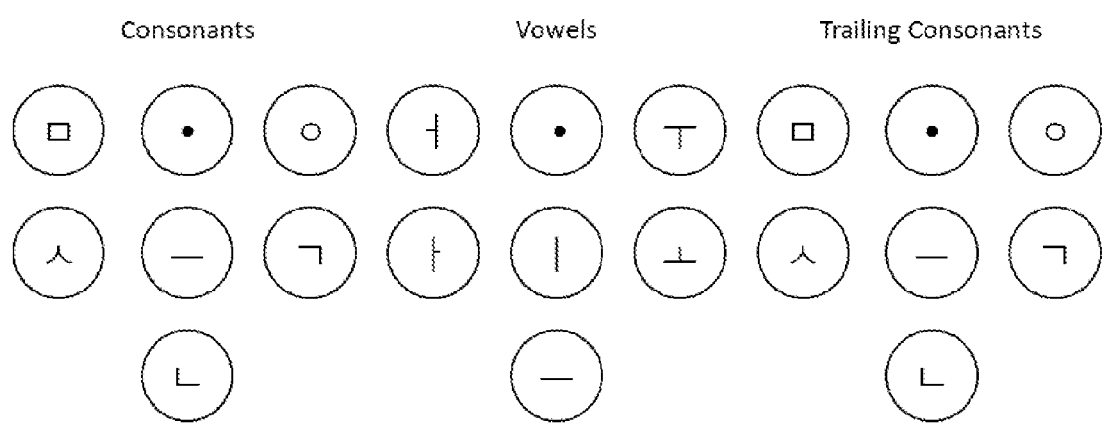
FIG. 7 is a diagram for yet another embodiment of any language input system showing first, second, and third groups of keys.

FIG. 7 is a diagram for yet another embodiment of any language input system showing first, second, and third groups of keys. Here, the input system comprises a first group of keys for inputting a consonant by pressing a single key or simultaneously pressing a combination of keys thereof; a second group of keys for inputting a vowel by pressing a single key or simultaneously pressing a combination of keys thereof; and a third group of keys for inputting a trailing consonant by pressing a single key or simultaneously pressing a combination of keys thereof; wherein the first group of keys consists essentially of seven keys and is arranged on a first matrix of three rows and three columns, the second group of keys consists essentially of seven keys and is arranged on a second matrix of three rows and three columns, and the third group of keys consists of seven keys and is arranged on a third matrix of three rows and three columns.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A language input system using a computer-implemented keypad or keyboard comprising:
   a first group of keys for inputting a consonant by pressing a single key or simultaneously pressing a combination of keys thereof; and
   a second group of keys for inputting a vowel by pressing a single key or simultaneously pressing a combination of keys thereof;
   wherein the first group of keys consists essentially of seven keys and is arranged on a first matrix of three rows and three columns, and the second group of keys consists essentially of seven keys and is arranged on a second matrix of three rows and three columns,
   wherein the first group of keys consists essentially of five Hangul simple consonant letters and two function key,
   wherein the five Hangul simple consonant letters are one velar consonant, one coronal consonant, one bilabial consonant, one sibilant consonant and one glottal consonant of Hangul simple consonant letters, and
   wherein the two function keys are for inputting other velar consonants, coronal consonants, bilabial consonants, sibilant consonants or glottal consonants of Hangul by simultaneously pressing one or two of the two function keys and one of the five Hangul simple consonant letters, wherein the two function keys are arranged on the second column of the first matrix, one of the two function keys occupying the second column and second row of the first matrix.

2. The language input system of claim 1, wherein a double consonant is input by simultaneously pressing none or one of the two function keys and two of the five Hangul simple consonant letters.

3. The language input system of claim 2, wherein the five Hangul simple consonant letters are "ㅁ", "ㅇ", "ㅅ", "ㅣ", and "ㄴ", and the two function keys are "•" and "—"; wherein "—" is arranged on the second column and second row of the first matrix.

4. The language input system of claim 3 "ㄴ", "ㅇ", "ㅅ", "ㄱ", and "ㅣ" are respectively arranged on first row and first column, first row and third column, second row and first column, second row and third column, and third row and second column of the first matrix.

5. The language input system of claim 4, wherein the consonant sound of "ㅁ"; (m) is input by pressing the key "ㅁ"; ㅂ (b) is input by simultaneously pressing "ㅁ" and "—"; ㅍ (p) by "ㅣ", "—" and "•"; ㅃ (bb) by "ㅣ", "—" and "ㅅ"; ㅎㅇ ㅇ (f) by "ㅁ", "—", "•" and "ㅇ"; ㅂㅇ (V) by "ㅁ", "—" and "ㅇ"; ㅅ (s) by "ㅅ"; ㅈ (j) by "ㅅ" and "—"; ㅉ (jj, z) by "ㅅ", "ㄴ" and "—"; ㅊ (c) by "ㅅ", "—" and "•"; ㅅ ㅇ (sh) by "ㅅ" and "ㅇ"; ㅈ ㅇ (zh) by "ㅅ", "—" and "ㅇ"; ㅊ ㅇ (ch) by "ㅅ", "—", "•" and "ㅇ"; ㅆ (ss) by "ㅅ" and "ㄴ"; ㅣ (n) by "ㄴ"; ㄷ (d) by "ㄴ" and "—"; ㅌ (t) by "ㄴ", "—" and "•"; ㄸ (dd) by "ㅣ", "—" and "ㅇ"; ㅌ ㅇ (th) by "ㅣ", "—", "•" and "ㅇ"; ㄹ (l) by "ㄱ", "—" and "ㄴ"; ㄹ ㅇ (r) by "ㅣ", "—", "ㅣ", and "ㅇ"; ㄱ (g) by "ㄱ"; ㅋ (k) by "ㄱ" and "—"; ㄲ (gg) by "ㄱ" and "e,dot ㅇ"; ㅇ (ng) by "ㅇ"; and ㅎ (h) by "ㅇ", "—" and "•".

6. A language input system using a computer-implemented keypad or keyboard comprising:
   a first group of keys for inputting a consonant by pressing a single key or simultaneously pressing a combination of keys thereof; and
   a second group of keys for inputting a vowel by pressing a single key or simultaneously pressing a combination of keys thereof;
   wherein the first group of keys consists essentially of seven keys and is arranged on a first matrix of three rows and three columns, and the second group of keys consists essentially of seven keys and is arranged on a second matrix of three rows and three columns,
   wherein the second group of keys consists essentially of six Hangul simple vowel letters and one Hangul archaic vowel letter, wherein the six Hangul simple vowel letters are "ㅓ", "ㅜ", "ㅏ", "ㅣ", "ㅗ", and "—" and the Hangul archaic vowel letter is "•",
wherein "ㅓ", "ㅜ", "ㅏ", "ㅣ", "ㅗ", and "—" are respectively arranged on first row and first column, first row and third column, second row and first column, second row and second column, second row and third column, and third row and second column of the second matrix, and "•" is arranged on first row and second column of the second matrix.

7. A language input system using a computer-implemented keypad or keyboard comprising:
   a first group of keys for inputting a consonant by pressing a single key or simultaneously pressing a combination of keys thereof; and
   a second group of keys for inputting a vowel by pressing a single key or simultaneously pressing a combination of keys thereof;
   wherein the first group of keys consists essentially of seven keys and is arranged on a first matrix of three rows and three columns, and the second group of keys consists essentially of seven keys and is arranged on a second matrix of three rows and three columns, further comprising:
   a trailing consonant key for inputting a trailing consonant;
   wherein the trailing consonant key is pressed to input a trailing consonant using the first group of keys,
   wherein the trailing consonant key is arranged on the second matrix,
   wherein the trailing consonant key is arranged on the second matrix of third row and third columns.

8. A language input system using a computer-implemented keypad or keyboard comprising:
   a first group of keys for inputting a consonant by pressing a single key or simultaneously pressing a combination of keys thereof; and
   a second group of keys for inputting a vowel by pressing a single key or simultaneously pressing a combination of keys thereof;
   wherein the first group of keys consists essentially of seven keys and is arranged on a first matrix of three rows and three columns, and the second group of keys consists essentially of seven keys and is arranged on a second matrix of three rows and three columns,
   further comprising:
   a third group of keys for inputting a trailing consonant by pressing a single key or simultaneously pressing a combination of keys thereof;
   wherein the third group of keys consists of seven keys and is arranged on a third matrix of three rows and three columns.

* * * * *